United States Patent
Hama

[19]
[11] Patent Number: 5,874,968
[45] Date of Patent: Feb. 23, 1999

[54] CIRCLE DRAWING METHOD

[75] Inventor: Kiyoko Hama, Kanagawa, Japan

[73] Assignee: NEC Corporation, Tokyo, Japan

[21] Appl. No.: 919,125

[22] Filed: Aug. 28, 1997

[30] Foreign Application Priority Data

Aug. 29, 1996 [JP] Japan ................................... 8-228734

[51] Int. Cl.$^6$ .................................................. G06F 15/00
[52] U.S. Cl. .......................................................... 345/442
[58] Field of Search .................................. 345/441, 442, 345/440, 127, 128

[56] References Cited

U.S. PATENT DOCUMENTS

| | | | |
|---|---|---|---|
| 4,600,919 | 7/1986 | Stern | 340/725 |
| 5,592,599 | 1/1997 | Lindholm | 345/627 |

FOREIGN PATENT DOCUMENTS 4-52776  2/1992  Japan .

*Primary Examiner*—Phu K. Nguyen
*Attorney, Agent, or Firm*—Sughrue, Mion, Zinn, Macpeak & Seas, PLLC

[57] ABSTRACT

A check is performed whether a terminating point distanced from said starting point in a distance corresponding to a one-eighth fraction of an entire circumferential length of the circle to be drawn is passed by the latest set point. When said terminating point is passed, drawing process is terminated. If the terminating point is not passed, all points symmetric to the set point with respect to at least one straight line selected from a group of the straight line Y=X, the X-axis and the Y-axis are derived for use in drawing the circle. Next, the X coordinate of the set point is varied. Then, a value for judgment associating with variation of the X coordinate of the set point with the latest value for judgment is calculated. Thereafter, a check is performed whether a distance between the Y coordinate of a first varied point where only the X coordinate is varied from the set point and the true Y coordinate on the circle at the same X coordinate is less than 0.5 or not. When the distance between the Y coordinate of the first varied point and the true Y coordinate is less than 0.5, the first varied point is set as a new set point. On the other hand, the Y coordinate is varied from the first varied point when the distance between the Y coordinate of the first varied point and the true Y coordinate is greater than or equal to 0.5.

10 Claims, 12 Drawing Sheets

FIG. IA
(PRIOR ART)
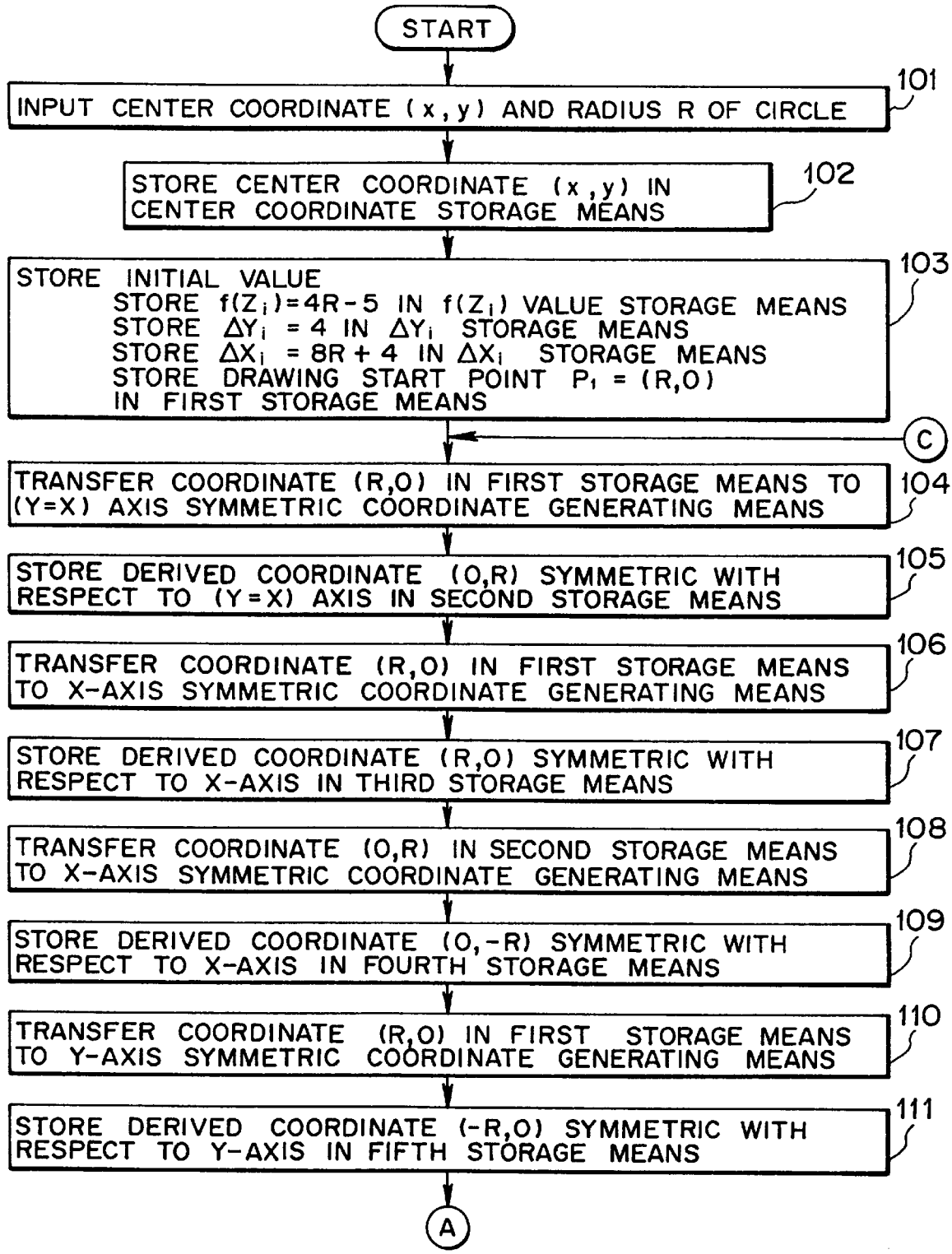

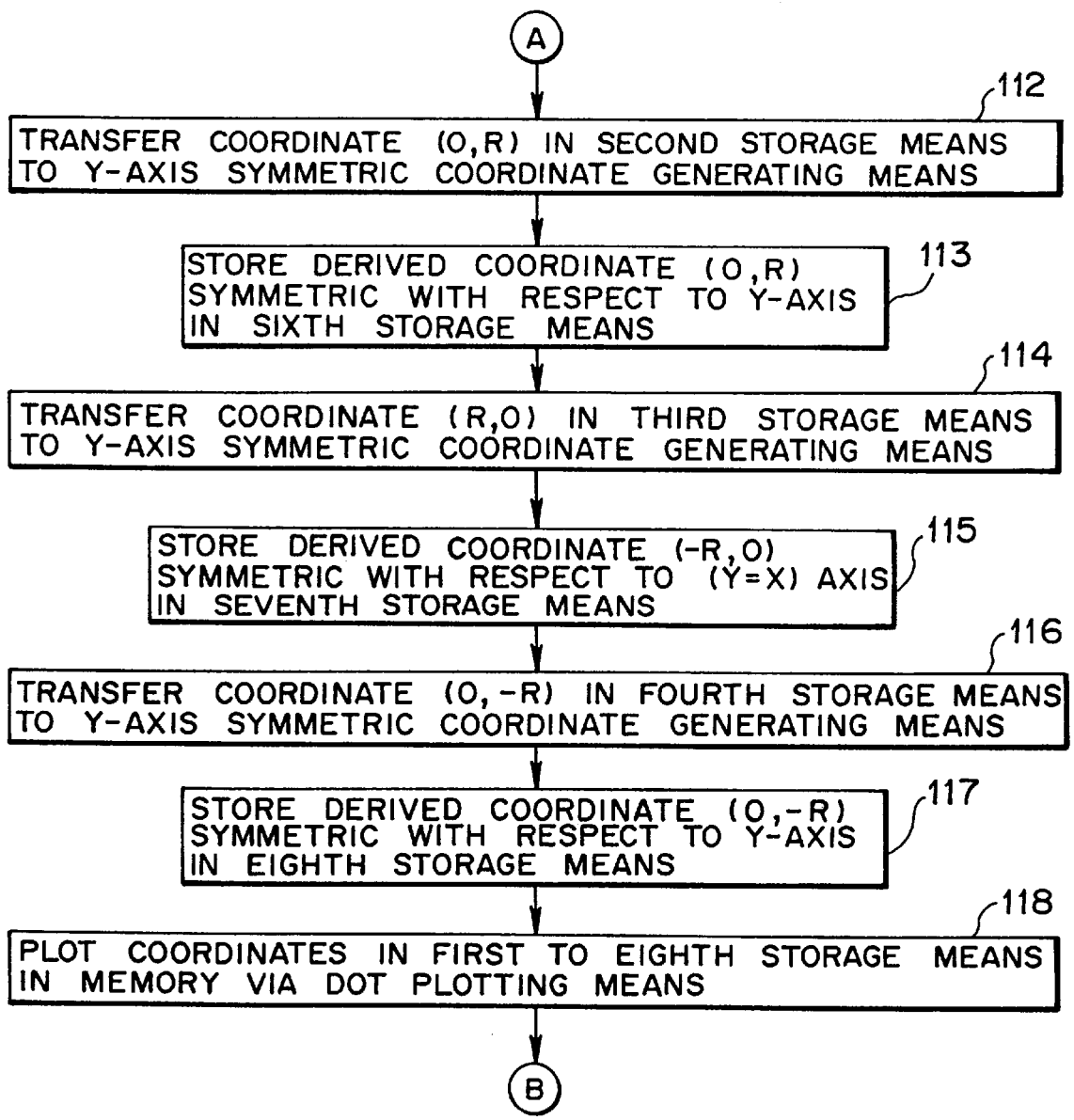
FIG.IB
(PRIOR ART)

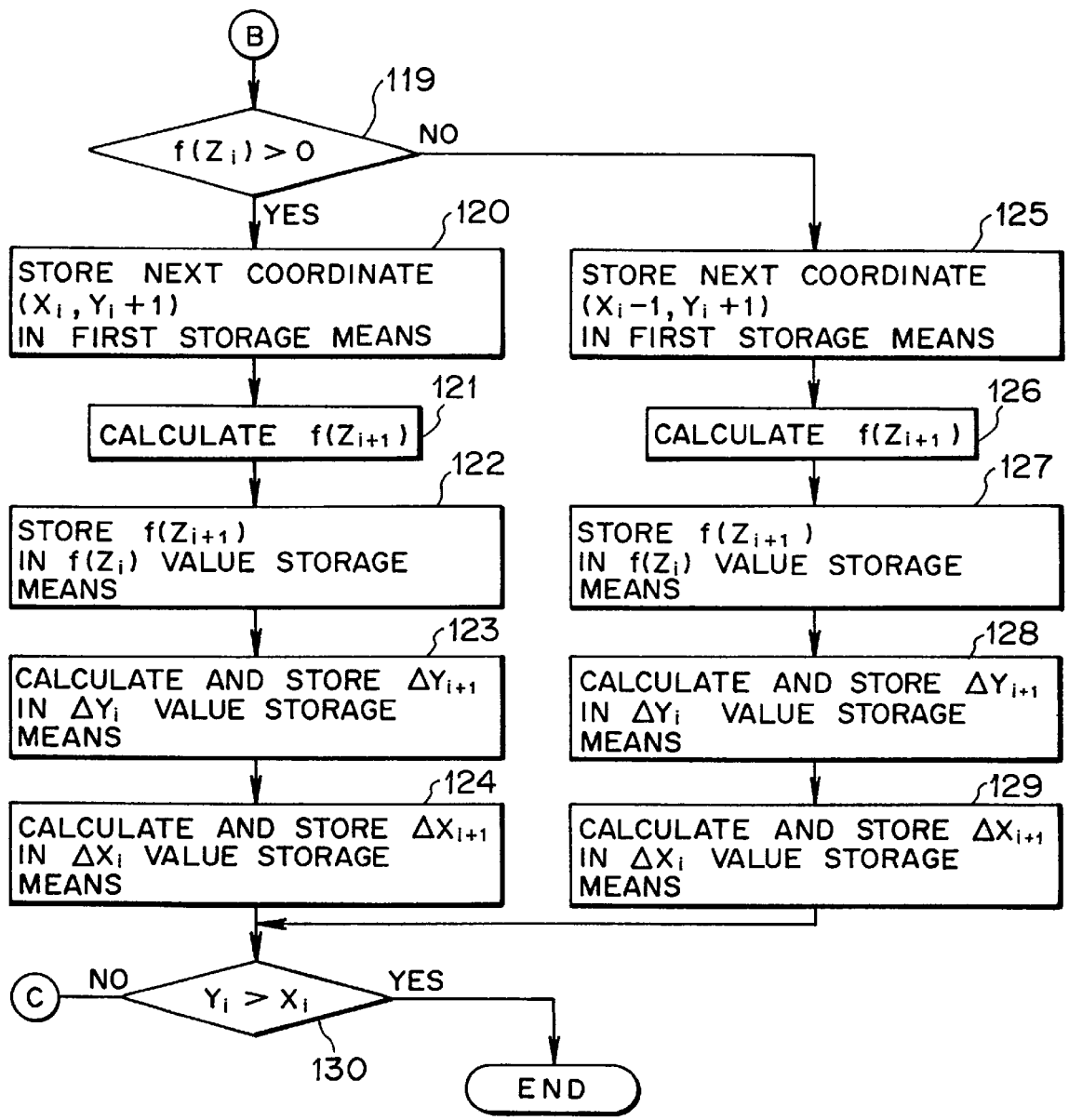
FIG.IC
(PRIOR ART)

CIRCLE DRAWING METHOD

BACKGROUND OF THE INVENTION

1. Field of the Invention

The present invention relates to a circle drawing method for drawing a circle at high speed by a personal computer or the like on an output device such as a display, a printing device or the like.

2. Description of the Prior Art

There has been proposed a method for graphically outputting a circle by a personal computer or the like (Japanese Unexamined Patent Publication No. Hei 4-52776). In the method disclosed in the above-identified publication, a one-eighth fraction of a circle is drawn by a minimum axial distance method. In the minimum axial distance method, a function expressed by the following equation (1) is defined with respect to a known or determined point $P_{i-1}$ ($X_{i-1}$, $Y_{i-1}$) on the circle.

$$f(Z_i) = R^2 \{(X_{i-1} \tfrac{1}{2})^2 + (Y_{i-1}+1)^2\} \quad (1)$$

$$\Delta Y_{i-1} = 2Y_{i-1} + 1 \quad (2)$$

$$\Delta X_{i-1} = 2X_{i-1} + 1 \quad (3)$$

Then, depending upon the sign of the function $f(Z_i)$, coordinates of points to be plotted are determined for progressing drawing of a circle. For example, when, assuming a coordinate of a start point of drawing of a circle is (R, 0), a one-eighth fraction of the circle to the intersection with a straight line Y=X is to be drawn with increase of the Y coordinate, if the function $f(Z_i)$ is positive, the X coordinate is not reduced, and if the function $f(Z_i)$ is not positive, the X coordinate is reduced. When $f(Z_i) > 0$ is established, the following equations (4) to (6) are established, and when $f(Z_i) \leq 0$ is established, the following equations (7) to (9) are established.

$$f(Z_{i+1}) = f(Z_i) - \Delta Y_{i-1} \quad (4)$$

$$\Delta Y_i = \Delta Y_{i-1} + 2 \quad (5)$$

$$\Delta X_i = \Delta_{i-1} \quad (6)$$

$$f(Z_{i+1}) = f(Z_i) - \Delta Y_{i+1} \Delta X_{i-1} \quad (7)$$

$$\Delta Y_i = \Delta Y_{i-1} + 2 \quad (8)$$

$$\Delta X_i = \Delta X_{i-1} - 2 \quad (9)$$

Next, discussion will be given for the circle drawing method disclosed in the above-identified publication with reference to the drawings. FIGS. 1A to 1C are flowcharts illustrating a circle drawing method disclosed in the foregoing Japanese Unexamined Patent Publication No. Hei 4-52776. First, as shown in FIG. 1A, a coordinate of the center and a radius R of a circle to be drawn are input (step 101). Then, the input coordinate of the center is stored in a center coordinate storage means (step 102). Then, $P_1$ (R, 0) as a drawing start point is determined. At this time, $f(Z_2) = R-5/4$ is established. However, in order to avoid operation of fraction, the foregoing equations (1) to (9) are used as multiplied by four, in practice. Then, the drawing start point $P_1$(R, 0) is stored in a first storage means, and $f(Z_2) = 4R-5$ is stored in a $f(Z_i)$ value storage means. Furthermore, $\Delta Y_1 = 4$ is stored in a $\Delta Y_1$. value storage means, and $\Delta X_1 = 8R+4$ is stored in a $X_i$ value storage means (step 103).

Next, the coordinate (R, 0) stored in the first storage means is transferred to a (Y=X) axis symmetric coordinate generating means (step 104). Then, a coordinate (0, R) symmetric to the coordinate (R, 0) with respect to the (Y=X) axis is derived. The coordinate (0, R) thus derived is stored in a second storage means (step 105). Next, the coordinate (R, 0) stored in the first storage means is transferred to an X-axis symmetric coordinate generating means (step 106). Then, a coordinate (R, 0) symmetric to the coordinate (R, 0) with respect to the X-axis is derived. The coordinate (R, 0) thus derived is stored in a third storage means (step 107). Furthermore, the coordinate (0, R) stored in the second storage means is transferred to the X-axis symmetric coordinate generating means (step 108). Then, a coordinate (0, -R) symmetric to the coordinate (0, R) with respect to the X-axis is derived. This coordinate (0, -R) is stored in a fourth storage means (step 109).

Next, the coordinate (R, 0) stored in the first storage means is transferred to a Y-axis symmetric coordinate generating means (step 110). Then, the coordinate (-R, 0) symmetric to the coordinate (R, 0) with respect to the Y-axis is derived. This coordinate (-R, 0) is stored in a fifth storage means (step 111). Then, as shown in FIG. 1B, the coordinate (0, R) stored in the second storage means is transferred to the Y-axis symmetric coordinate generating means (step 112). Then, the coordinate (0, R) symmetric to the coordinate (0, R) with respect to the Y-axis is derived. This coordinate (0, R) is stored in a sixth storage means (step 113). Furthermore, the coordinate (R, 0) stored in the third storage means is transferred to the Y-axis symmetric generating means (step 114). Then, the coordinate (-R, 0) symmetric to the coordinate (R, 0) with respect to the Y-axis is derived. The coordinate (-R, 0) thus derived is stored in a seventh storage means (step 115). Next, the coordinate (0, -R) stored in the fourth storage means is transferred to the Y-axis symmetric coordinate generating means (step 116). Then, the coordinate (0, -R) symmetric to the coordinate (0, -R) with respect to the Y-axis is derived. This coordinate (0, -R) is stored in an eighth storage means (step 117). These coordinates stored in the first to eighth storage means are plotted in a memory via a dot plotting means (step 118).

Next, as shown in FIG. 1C, the sign of $f(Z_2)$ is checked (step 119). If the sing of $f(Z_2)$ is positive, $P_2(X_1, Y_1+1) = (R, 1)$ is stored in the first storage means as the next coordinate (step 120). Then, $f(Z_3)$ for the next coordinate is calculated (step 121). Next, $f(Z_3)$ is stored in the $(Z_i)$ value storage means (step 122). Also, $\Delta Y_2$ is calculated and stored in the $\Delta Y_i$ value storage means (step 123). Then, $\Delta X_2$ is calculated and stored in the $\Delta X_i$ value storage means (step 124). Next, $X_i$ value and $Y_i$ value are compared for checking whether drawing of the one-eighth fraction of the circle is completed or not in the next coordinate. If not $X_i > Y_i$, the operation is terminated as completed. If $X_i > Y_i$, the process returned to the step 104 in FIG. 1A (step 130).

On the other hand, if $f(Z_2)$ is not positive as checked at the step 119, $P_2$ ($X_1-1$, $Y_1+1$) = (R-1, 1) is stored in the first storage means (step 125). Then, the processes up to the comparison of $X_i$ value and $Y_i$ value are performed similarly to the case where the $f(Z_2)$ is positive (steps 126 to 130).

Next, discussion will be given for a method for deriving coordinate values to be stored in the first storage means until the one-eighth fraction of the circle is drawn. FIGS. 2A to 2G are diagrammatic illustrations showing points stored in the first storage means in sequential order. First, as shown in FIG. 2A, a point 201 has been determined as the drawing start point (R, 0). Then, as shown in FIG. 2B, the coordinate of the next point 202 is determined in response to the sign of $f(Z_2)$. In this case, since the sign of $f(Z_2)$ is positive, the Y coordinate is increased by one from the point 201 and the X coordinate is held unchanged. Next, $f(Z_3)$ is derived from $f(Z_2)$, $\Delta X_1$ and $\Delta Y_1$. The coordinate of the next point 203 is determined in response to the sign of $f(Z_3)$. In this case, as shown in FIG. 2C, since the sign of $f(Z_3)$ is positive, the Y coordinate is increased by one from the point 202, and the X coordinate is held unchanged. Furthermore, $f(Z_4)$ is derived from $f(Z_3)$, $\Delta X_2$ and $\Delta Y_2$, and the coordinate of the next point 204 is determined in response to the sign of $f(Z_4)$. In this case, as shown in FIG. 2D, since the sign of $f(Z_4)$ is not positive, the Y coordinate is increased by one and the X coordinate is decreased by one from the point 203.

Similarly, $f(Z_5)$ is derived. Depending upon the sign of $f(Z_5)$, the coordinate of the next point 205 is determined. In this case, as shown in FIG. 2E, since the sign of $f(Z_5)$ is positive, the Y coordinate is increased by one from the point 204, and the X coordinate is held unchanged. Then, $f(Z_6)$ is derived, and the coordinate of the next point 6 is determined in response to the sign of $f(Z_6)$. In this case, as shown in FIG. 2F, since the sign of $f(Z_6)$ is not positive, the Y coordinate is increased by one and the X coordinate is decreased by one from the point 205. Furthermore, $f(Z_7)$ is derived, and the coordinate of the next point 7 is determined in response to the sign of $f(Z_7)$. In this case, as shown in FIG. 2G, since the sign of $f(Z_7)$ is not positive, the Y coordinate is increased by one and the X coordinate is decreased by one from the point 206. Then, since X=Y is established at the coordinate of the point 7, calculation of the coordinates of the one-eighth fraction of the circle is completed. It should be noted that, while not illustrated, points symmetric to respective points 201 to 207 with respect to the (Y=X) axis, the X-axis and/or the Y-axis are derived sequentially.

By the circle drawing method disclosed in Japanese Unexamined Patent Publication No. Hei 4-52776, a full circle is drawn by calculating a one-eighth fraction by the minimum axial direction method. Therefore, a circle can be drawn at high speed.

However, in the foregoing conventional circle drawing method, all of $f(Z_i)$, $\Delta X_i$ and $\Delta Y_i$ have to be calculated for calculating each coordinate point. When a radius of a circle to be drawn becomes large, a circumferential length becomes long to increase number of points to be calculated. Therefore, when large amount of calculation has to be performed for deriving each coordinate point as the foregoing conventional method, number of process steps increases significantly according to increasing of radius. Thus, process period becomes significantly long. On the other hand, since respective points calculated are stored in respective of the first to eighth storage means at every occasion, memory region for these points is necessary. Thus, large memory region used for drawing a circle becomes required.

SUMMARY OF THE INVENTION

It is an object of the present invention to provide a circle drawing method which requires lesser number of process steps to shorten process period, and does not require large memory capacity.

A circle drawing method, according to one aspect of the present invention, includes a step of setting a coordinate of the center and a radius of a circle to be drawn. Subsequently, a starting point for drawing the circle is set. Then, a value for judgment at the starting point is derived. Next, checking is performed whether a terminating point distanced from the starting point in a distance corresponding to a one-eighth fraction of an entire circumferential length of the circle to be drawn is passed by the latest set point or not. Drawing process is terminated when the terminating point is passed. On the other hand, when the terminating point is not passed, all points symmetric to, the set point with respect to at least one straight line selected from a group consisted of the straight line Y=X, the X-axis and the Y-axis are derived for use in drawing the circle.

Subsequently, the X coordinate of the set point is varied. Then, a value for judgment associating with variation of the X coordinate of said set point is derived with the latest value for judgment. Then, a check is performed whether a distance between the Y coordinate of a first varied point where only the X coordinate is varied from the set point and the true Y coordinate on the circle at the same X coordinate is less than 0.5 or not with the value for judgment. The first varied point is set as a new set point and then returning to the step of checking whether the terminating point distanced is passed or not, when the distance between the Y coordinate of the first varied point and the true Y coordinate is less than 0.5. On the other hand, the Y coordinate is varied from the first varied point when the distance between the Y coordinate of the first varied point and the true Y coordinate is greater than or equal to 0.5. Then, a value for judgment associated with variation of the Y coordinate of the first varied point with the latest value for judgment is derived. Subsequently, a second varied point varied where only the Y coordinate is varied from the first varied point is set as a new set point. Thereafter, process returns to the step of checking whether the terminating point is passed or not.

A circle drawing method, according to another aspect of the present invention, includes a step of setting a coordinate of the center and a radius of a circle to be drawn. Subsequently, a starting point for drawing the circle is set. Then, a value for judgment at the starting point is derived. Next, checking is performed whether a terminating point distanced from the starting point in a distance corresponding to a one-eighth fraction of an entire circumferential length of the circle to be drawn is passed by the latest set point or not. Drawing process is terminated when the terminating point is passed. On the other hand, when the terminating point is not passed, all points symmetric to the set point with respect to at least one straight line selected from a group consisted of the straight line Y=X, the X-axis and the Y-axis are derived for use in drawing the circle.

Subsequently, the X coordinate of the set point is varied. Then, a value for judgment associating with variation of the X coordinate of said set point is derived with the latest value for judgment. Then, a check is performed whether a distance between the Y coordinate of a first varied point where only the X coordinate is varied from the set point and the true Y coordinate on the circle at the same X coordinate is less than 0.5 or not with the value for judgment. The first varied point is set as a new set point and then returning to the step of checking whether the terminating point distanced is passed or not, when the distance between the Y coordinate of the first varied point and the true Y coordinate is less than 0.5. On the other hand, the Y coordinate is varied from the first varied point when the distance between the Y coordinate of the first varied point and the true Y coordinate is greater than or equal to 0.5. Then, a value for judgment associated with variation of the Y coordinate of the first varied point with the latest value for judgment is derived. Subsequently, a second varied point varied where only the Y coordinate is varied from the first varied point is set as a new set point. Thereafter, process returns to the step of checking whether the terminating point is passed or not.

According to the present invention, judgement whether the Y coordinate is varied or not with variation of the X coordinate is simplified. Therefore, it is unnecessary to handle many complex formulas for calculate the coordinate of each point on a circle to be drawn. Thus, process period can be shorten. Also, since the consequence of the calculation can be used for displaying the circle, memory region for the calculation can be less.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings:

FIGS. 1A to 1C are flowcharts illustrating a circle drawing method disclosed in Japanese Unexamined Patent Publication No. Hei 4-52776;

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscuring the present invention.

In the first embodiment of a circle drawing method according to the present invention, coordinates of points of a one-eighth fraction of a circle on an XY plane are calculated with taking the X-axis in the horizontal axis and the Y-axis in the vertical axis. Then, coordinates of points symmetric to respective points with respective to the straight line Y=X are calculated. Furthermore, points symmetric to these points with respect to the origin (0, 0), X-axis and Y-axis are derived. By sequentially deriving coordinates of the points, the desired circle can be drawn. It should be noted that, upon drawing the one-eighth fraction of the circle on the XY plane, the optimal Y coordinate to the X coordinate is derived to obtain the coordinate of each point with varying the X coordinate in one-by-one, in the first embodiment.

Figure 2A:
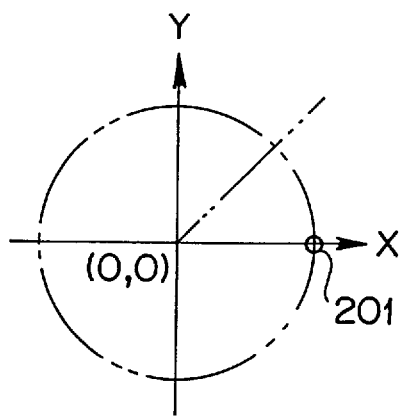
FIGS. 2A to 2G are diagrammatic illustrations showing points stored in the first storage means in sequential order.
Figure 2B:
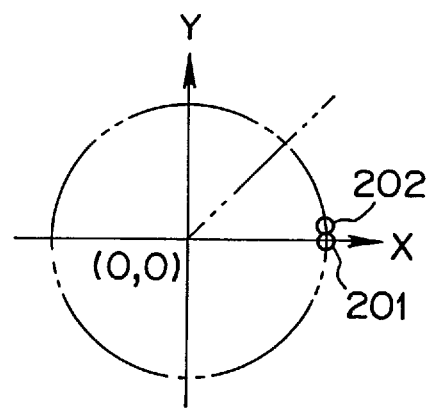
Figure 2C:
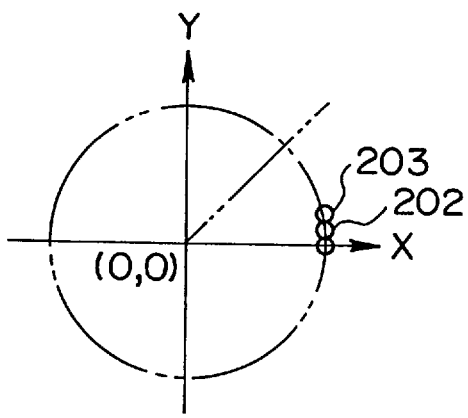
Figure 2D:
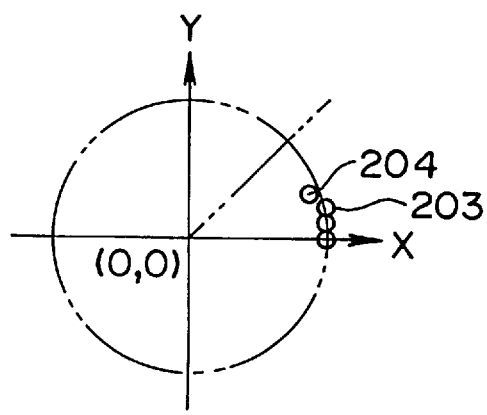
Figure 2E:
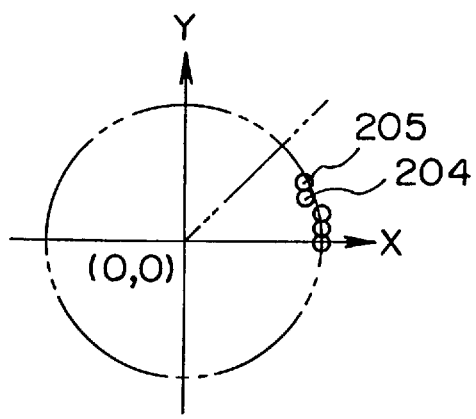
Figure 2F:
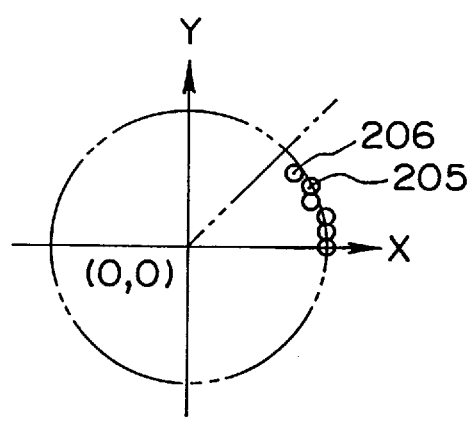
Figure 2G:
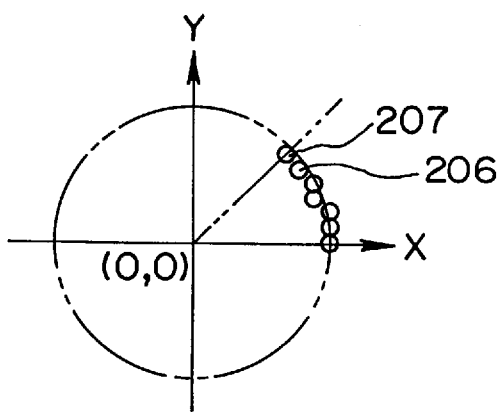
Figure 3:
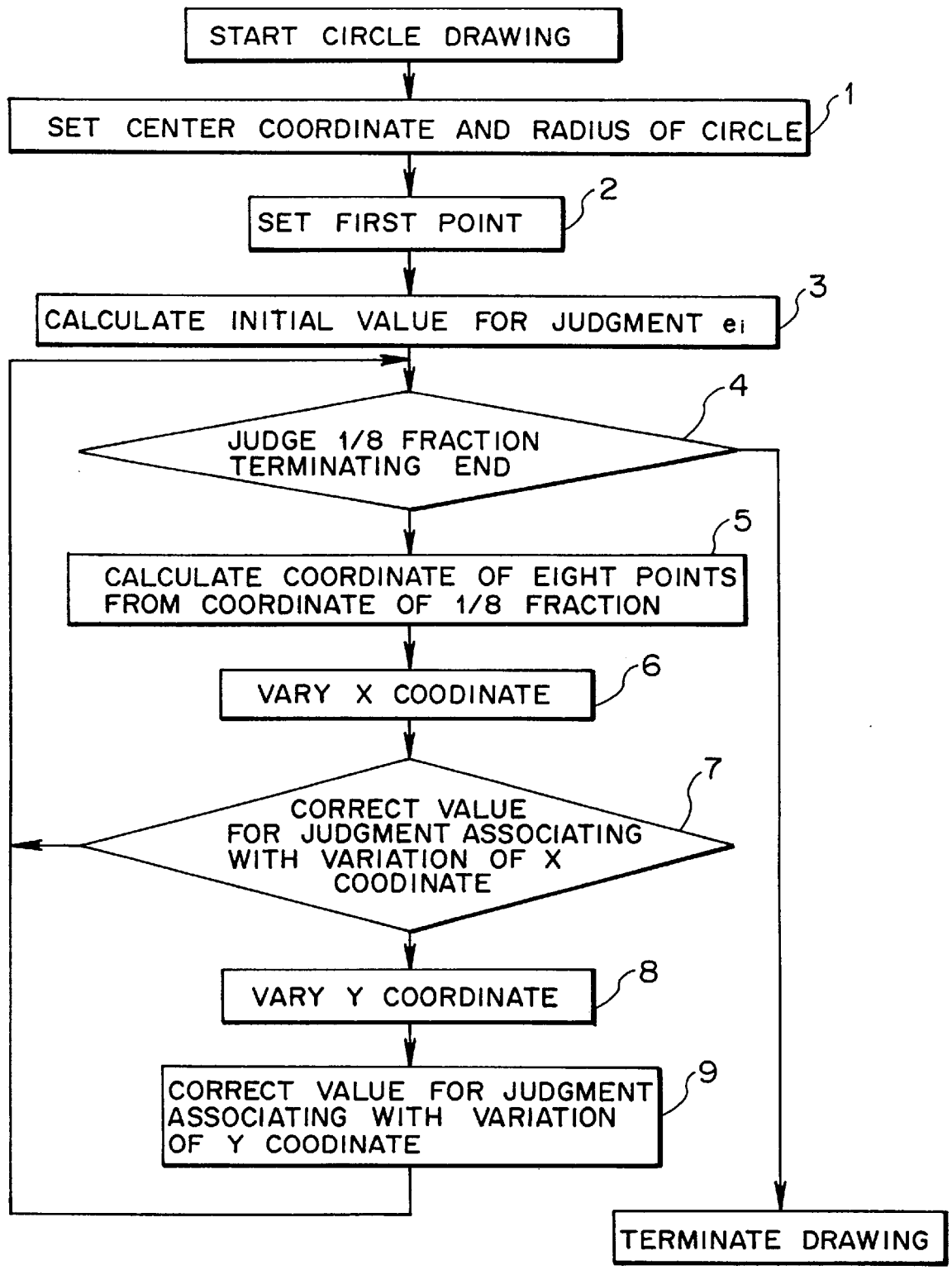
FIG. 3 is a flowchart showing the first embodiment of a circle drawing method according to the present invention.

FIG. 3 is a flowchart showing the first embodiment of a circle drawing method according to the present invention. First, a coordinate $(X_0, Y_0)$ of the center and a radius r of a circle to be drawn are determined (step 1). In the method of the shown embodiment, after deriving coordinates of points on the circumference with the radius r about the origin (0, 0), these coordinates are corrected with respect to the center coordinate $(X_0, Y_0)$ to derive the coordinates of the points on the actual circumference.

Next, the coordinate of the first point to be the starting point of the process is set (step 2). For simplification of subsequent calculation, a point (0, r) or (0, -r) on the Y-axis is selected as the coordinate of the first point. Then, using the coordinate of the first point, the initial value $e_1$ of a value for judgment $e_i$ is calculated (step 3). On the basis of the value for judgment $e_i$, an optimal Y coordinate is calculated.

Next, the process enters a routine for deriving coordinates of points on the circumference. In this routine, first, a check is performed whether the latest point have passed a terminating point circumferentially distanced for one-eight of the entire circumference of the circle from the first point. If the terminating point is passed, the drawing process is completed. Otherwise, the process is advanced to the next step (step 4). When the terminating point is not passed, the point symmetric to the latest point with respect to the straight line Y=X is derived. Also, points symmetric to these two points with respect to the origin (0, 0), the X-axis and the Y-axis are derived, respectively. Then, these eight coordinates are corrected with respect to the center coordinate and sequentially used as display of the circle (step 5). The point symmetric to a certain point A with respect to the straight line Y=X can be derived by reversing the X coordinate value and the Y coordinate value. On the other hand, coordinates of points symmetric to the point A with respect to the origin, X-axis and Y-axis can be derived by inversion of the sign or combination of inversion of the sign and revering of the coordinate values. Then, these eight points are corrected with respect to the center coordinate. Points derived from a point (X, Y) are as follows:

$(X_0+X, Y_0+Y)$, $(X_0+X, Y_0-Y)$, $(X_0-X, Y_0+Y)$, $(X_0-X, Y_0-Y)$, $(X_0+Y, Y_0+X)$, $(X_0+Y, Y_0-X)$, $(X_0-Y, Y_0+X)$ and $(X_0-Y, Y_0-X)$ Next, in order to obtain the next point, the X coordinate is varied by one (step 6). Then, using the X coordinate of the latest point, the value for judgment $e_i$ is corrected to derive a value for judgment $e_{i+1, X}$. Depending upon the sign of this value for judgment $e_{i+1, X}$, a check is performed whether the Y coordinate is to be varied associating with variation of the X coordinate or not. When the Y coordinate is not varied, the process is returned to the step 4. At this time, the value for judgment $e_{i+1, X}$ is used in the next routine as the value for judgment $e_{i+1}$. On the other hand, when the Y coordinate is to be varied, the process is advanced to step 8 (step 7). When judgment is made at step 7 that the Y coordinate is to be varied, the Y coordinate is varied (step 8). Then, the value for judgment $e_{i+1, X}$, is corrected using the Y coordinate of the latest point, and thus a value for judgment $e_{i+1, Y}$ is derived (step 9). Subsequently, the process is returned to the step 4. At this time, the value for judgment $e_{i+1, Y}$ is used at next routine as the value for judgment $e_{i+1}$. Then, a routine from the step 4 to the step 9 is repeated until passing to the terminating point is judged at the step 4.

Next, discussion for the calculation method of the value for judgment $e_i$ will be given on deriving a one-eighth fraction of a circle up to the intersection with a straight line Y=X from a point (0, r). First, (x, y) is assumed as coordinate in theory. At this time, since y>0 is established, the following equations (10) and (11) are established.

$$x^2+y^2=r^2 \tag{10}$$

$$y=(r^2-x^2)^{1/2} \tag{11}$$

On the other hand, upon actually drawing on a display or so forth, it is required to make one display point as a unit of coordinate. Therefore, (X, Y) of integer is used as coordinate from the origin (0, 0) used in displaying on a display or so forth. When the one-eighth fraction of the circle up to the intersection with the straight line Y=X from the point (0, r) is calculated, the value of y is reduced monotonously, it is required to establish the following expression (12).

$$Y<y+0.5 \tag{12}$$

It should be appreciated that this is established when the Y coordinate is (y−0.5) corresponding to the y coordinate located at the intermediate point between display points adjacent in the Y-axis direction. When the Y coordinate corresponding to the y coordinate is set at (y+0.5), the following expression (13) may be used.

$$Y \leq y+0.5 \tag{13}$$

When an integer value Y falls out of the foregoing equation (12) is given with respect to the theoretical value y, shape of the circle to be derived can be disturbed. The following formula (14) can be obtained from the foregoing equation (11) and (12).

$$Y<(r^2-X^2)^{1/2}+0.5$$

$$4r^2 x(Y^2-Y-r^2+x^2)+r^2<0 \tag{14}$$

Upon drawing the circle, the foregoing formula (14) has to be constantly satisfied. When the integer value X replacing the theoretical value x, and if the foregoing expression (14) is not established, the integer value Y is reduced to establish the equation (14). Namely, the left part of the foregoing equation (14) becomes the value for judgment, which is expressed by the following equation (15).

$$e_i=4r^2 x(Y^2-Y-r^2+x^2)+r^2 \tag{15}$$

If the value for judgment $e_i$ is negative, the Y coordinate is held unchanged and the process is returned to the step 4. On the other hand, the value for judgment $e_i$ is greater than or equal to 0, the process is returned to the step 4 through the steps 8 and 9.

In the method of the shown embodiment, it has been employed a method, in which the value for judgment $e_i$ already obtained is corrected associating with changing of the X coordinate and/or the Y coordinate to derive the next value for judgment $e_{i+1}$.

It should be noted that a one-eighth fraction of the circle to be obtained is not specified to the one-eighth fraction of the circle from the point (0, r) to the intersection with the straight line Y=X. For instance, a one-eighth fraction of the circle can be a fraction from a point (0, −r) to the intersection with the straight line Y=−X.

On the other hand, when the y coordinate is present on the intermediate point between the display points adjacent in the Y-axis direction, and the Y coordinate corresponding the y coordinate is assumed to be (y+0.5), judgment may be made whether the value for judgment $e_i$ is less than or equal to 0 or not.

Next, the manner of correction of the value for judgment $e_i$ will be discussed. When the value for judgment is expressed as $e_k$ (X, Y) when the (k)th point is present at (X, Y), the next value for judgment after increasing the X coordinate by one is expressed by $e_{k+1,X}$ (X+1, Y). At this time, variation $\Delta e_{k,X}$ of the value for judgment is expressed by the following equation (16).

$$\Delta e_{k,X}=e_{k+1,X}(X+1, Y)-e_k(X, Y) \tag{16}$$

The following equation (17) is obtained from the foregoing (15) and (16).

$$\Delta e_{k,X}=4r^2 \times (2X+1) \tag{17}$$

On the other hand, the value for judgment is expressed by $e_{k+1,Y}$ (X, Y−1) when the Y coordinate is decreased by one. At this time, variation $\Delta e_{k,Y}$ of the value for judgment is expressed by the following equation (18).

$$\Delta e_{k,Y}=e_{k+1,Y}(X, Y-1)-e_k(X, Y) \tag{18}$$

The following equation (19) is obtained from the foregoing equation (15) and (18)

$$\Delta e_{k,Y}=-8r^2 \times (Y-1) \tag{19}$$

Namely, the value for judgment $e_{i+X}$ when the X coordinate is increased by one is expressed by the following equation (20), and the value for judgment $e_{i+1,Y}$ when the Y coordinate is further decreased by one is expressed by the following equation (21).

$$e_{i+1,X}=e_i+\Delta e_{i,X} \tag{20}$$

$$e_{i+1,Y}=e_{i+1,X}+\Delta e_{i,Y} \tag{21}$$

In the shown embodiment of the method, instead of simply calculating the value for judgment shown in the foregoing equation (15) when the X coordinate or the Y coordinate is varied, the value for judgment is corrected by adding the variation $\Delta e_{k,X}$ and/or $\Delta e_{k,Y}$ expressed by the foregoing equations (17) or (19). Since these expressions are quite simple, operation can be performed at high speed.

Figure 4:
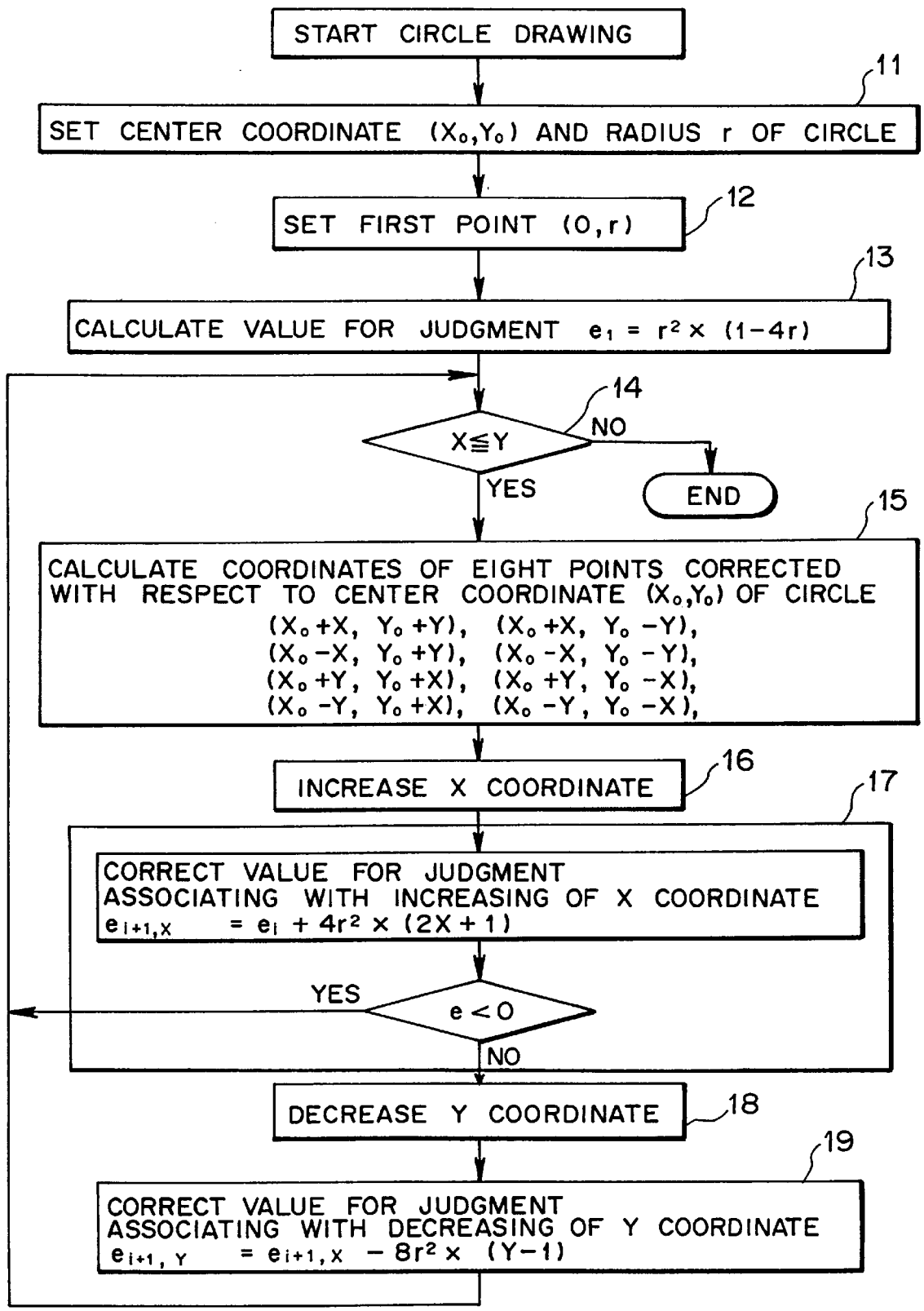
FIG. 4 is a flowchart showing definitely the first embodiment of a circle drawing method according to the present invention.
Figure 5:
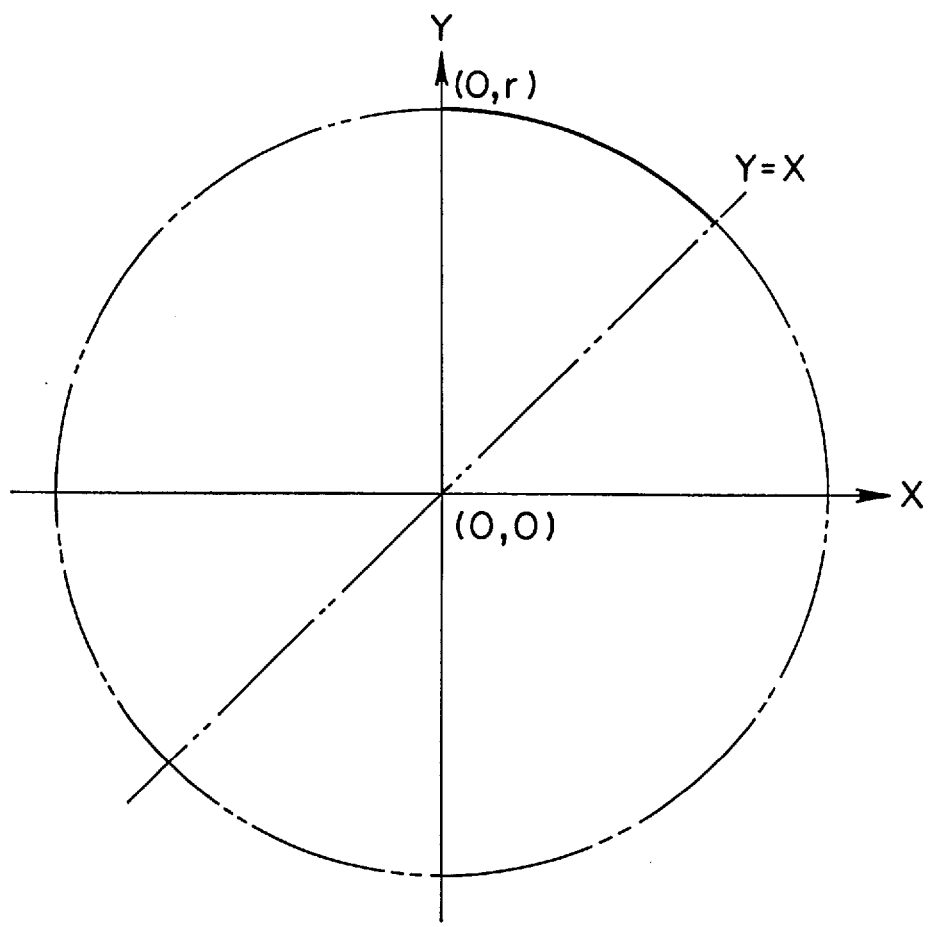
FIG. 5 is a diagrammatic illustration showing a one-eighth fraction of a circle directly derived from a value for judgment in the first embodiment of a circle drawing method.
Figure 6A:
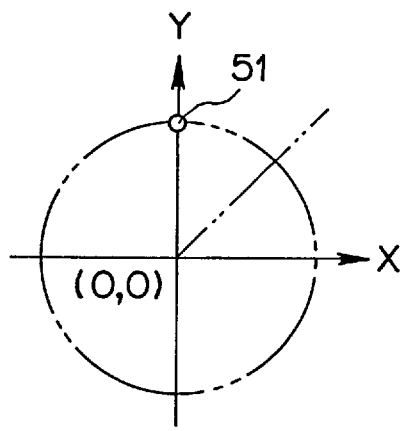
FIGS. 6A to 6G are diagrammatic illustrations showing process step of the first embodiment of a circle drawing method according to the present invention in sequential order.

Next, discussion will be given with respect to a practical circle drawing method. Here, it is assumed that the center coordinate of the circle is $(X_0, Y_0)$, and the radius of the circle is r. FIG. 4 is a flowchart showing definitely the first embodiment of a circle drawing method according to the present invention, FIG. 5 is a diagrammatic illustration showing a one-eighth fraction of a circle directly derived from the value for judgment by the first embodiment of a circle drawing method. FIGS. 6A to 6G are diagrammatic illustrations showing process steps of the first embodiment of a circle drawing method according to the present invention in sequential order. In the shown embodiment, as shown in FIG. 5, a one-eighth fraction of the circle to be directly derived from the value for judgment is a fraction from a point (0, r) to the intersection with the straight line Y=X. It should be appreciated that, in FIGS. 6A to 6G, points which do not locate at the one-eighth fraction of the circle from the point (0, r) to the intersection with the straight line Y=X are neglected from illustrations. First, the center coordinate $(X_0, Y_0)$ and the radius r of the circle to be drawn are set (step 11). Next, as shown in FIG. 6A, the coordinate of a first point 51 is set as (0, r) (step 12). Then, an initial value $e_1$ of the value for judgment $e_i$ is derived (step 13). From the foregoing equation (15), $e_{1\_r}{}^2 \times (1-4r)$ is established.

Subsequently, the process enters a routine for deriving coordinates of the points on the circumference of the one-eighth fraction of the circle. In this routine, first, judgment is performed whether a latest point passes a terminating point distanced from the first point for one-eighth of the entire circumferential length of the circle (step 14). In the shown embodiment of the method, judgment is made whether the following formula (22) is satisfied or not.

$$X \leq Y \qquad (22)$$

When the formula (22) is satisfied, the terminating point has not been passed. Then, the process is advanced to the next step. On the other hand, if the formula (22) is not satisfied, the drawing process goes end.

At the first point 51, the terminating point has not been passed. Therefore, subsequently, a point symmetric to the first point (0, r) with respect to the straight line Y=X is derived. Also, points symmetric to first point 51 or the point symmetric to the first point (0, r) with respect to the straight line Y=X, the origin (0, 0), the X-axis or the Y-axis are derived, respectively. As set forth above, the following points are derived from the point (X, Y) for use in drawing the circle.

$$(X_0+X, Y_0+Y), (X_0+X, Y_0-Y), (X_0-X, Y_0+Y), (X_0-X, Y_0-Y), (X_0+Y, Y_0+X), (X_0+Y, Y_0-X), (X_0-Y, Y_0+X), (X_0-Y, Y_0-X)$$

From the first point (0, r), points (0, −r), (r, 0) and (−r, 0) are obtained.

Next, the X coordinate is increased by one (step 16). Then, the value for judgment $e_1$ is corrected to derive the value for judgment $e_{2,X}$. At this time, since the X coordinate at the first point 51 is 0, the value for judgment $e_{2,X}$ is expressed by the following equation (23).

$$\begin{aligned} e_{2,X} &= e_1 + \Delta e_{1,k} \\ &= r^2 \times (1-4r) + 4r^2 \times (2X+1) \\ &= r^2 \times (1-4r) + 4r^2 \\ &\quad r^2 \times (5-4r) \end{aligned} \qquad (23)$$

In the shown embodiment, the value for judgment $e_{2,X}$ is negative, the process is then returned to the step 14 with setting $e_2 = e_{2,X} = r^2 \times (5-4r)$ (step 17).

Figure 6B:
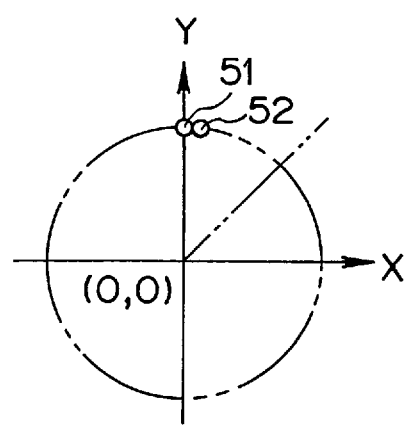

Next, a check is performed whether the terminating point is passed at a second point 52 (step 14). As the terminating point is not passed at the second point 52, as shown in FIG. 6B, coordinates of eight points are derived on the basis of the second point 52, in which the Y coordinate is held unchanged from the first point 51. These coordinates of eight points thus derived are also used in drawing the circle (step 15).

Similarly to the case of the second point, after increasing the X coordinate by one (step 16), the value for judgment $e_{3,X}$ for a third point 53 is derived. At this time, since the value for judgment $e_{3,X}$ is negative, the process is returned to the step 14 with taking the value for judgment $e_{3,X}$ as value for judgment $e_3$ (step 17).

Figure 6C:
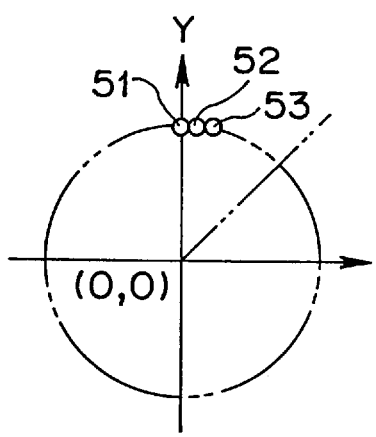

Next, a check is performed whether the terminating point is passed at the third point 53 (step 14). As the terminating point is not passed at the third point 53, as shown in FIG. 6C, coordinates of eight points are derived on the basis of the third point 53, in which the Y coordinate is held unchanged from the second point. These coordinates of eight points thus derived are also used in drawing the circle (step 15).

Then, after increasing the X coordinate by one (step 16), the value for judgment $e_{4,X}$ for a fourth point 54 is derived. In the shown embodiment, since the value for judgment $e_{4,X}$ is greater than or equal to 0 (step 17), the Y coordinate is decreased by one (step 18). Then, the value for judgment $e_{4,X}$ is corrected and a value for judgment $e_{4,Y}$ is derived (step 19). At this time, since the Y coordinate of the third point 53 is r, the value for judgment $e_{4,Y}$ is expressed by the following equation (24).

$$\begin{aligned} e_{4,Y} &= e_{4,X} + \Delta e_{3,X} \\ &= e_{4,X} - 8r^2 \times (Y-1) \\ &= e_{4,X} - 8r^2 \times (r-1) \end{aligned} \qquad (24)$$

Subsequently, with setting $e_4 = e_{4,Y}$ then process is returned to the step 14.

Figure 6D:
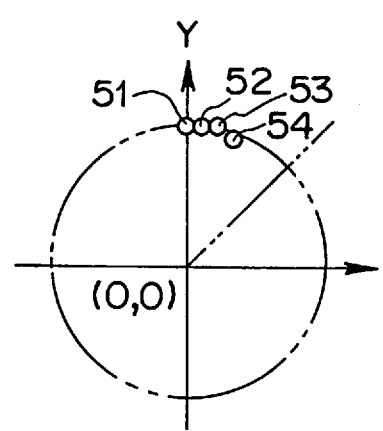

Next, after judgment whether the fourth point 54 does not pass the terminating point (step 14), as shown in FIG. 6D, coordinates of eight points are derived on the basis of the coordinate of the fourth point 54, in which the Y coordinate is decreased by one from the third point, and then used for drawing the circle (step 15).

Figure 6E:
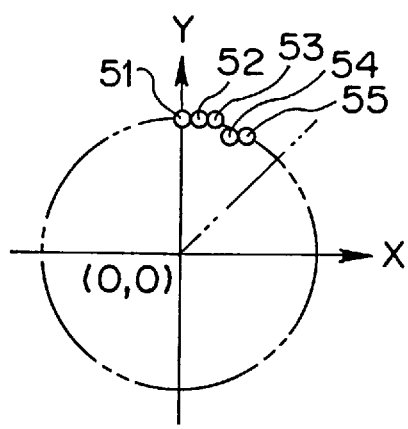
Figure 6F:
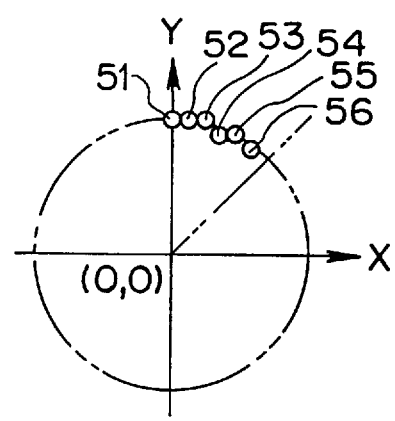
Figure 6G:
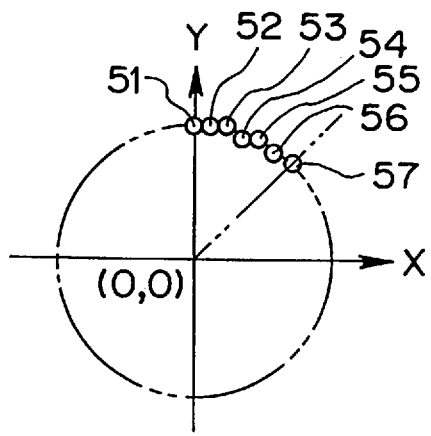

Subsequently, the routine through steps 14 to 19 is repeated until the one-eighth fraction of the circle is obtained. Namely, the value for judgment $e_{5,X}$ of a fifth point 55 is derived. In the shown embodiment, since the value for judgment $e_{5,X}$ is negative, as shown in FIG. 6E, the Y coordinate of the fifth point 55 is held unchanged and fixed. Also, the value for judgment $e_{6,X}$ of a sixth point 56 is obtained. In the shown example, the value for judgment $e_{6,X}$ is greater than or equal to 0, as shown in FIG. 6F, the Y coordinate of the sixth point 56 is decreased by one and fixed. Furthermore, the value for judgment $e_{7,X}$ of a seventh point 57 is obtained. In the shown example, the value for judgment $e_{7,X}$ is greater than or equal to 0, as shown in FIG. 6G, the Y coordinate of the seventh point 57 is decreased by one and fixed. At an eighth point 58, the foregoing equation (22) is not satisfied. Then, the process of calculating the circle goes end by the judgment at the step 4.

In the shown embodiment of the method, the value for judgment $e_{i,X}$ is calculated for each point and the value for judgment $e_{i,Y}$ if required. Therefore, each point can be derived through one or two times of calculation. In practice, in order to draw the same circle, while fifty-five instructions are required in the prior art shown in FIGS. 1A to 1C, only forty-three instructions are required in the shown embodiment. Therefore, the process time and program amount are improved in the extent of 20%.

Figure 7:
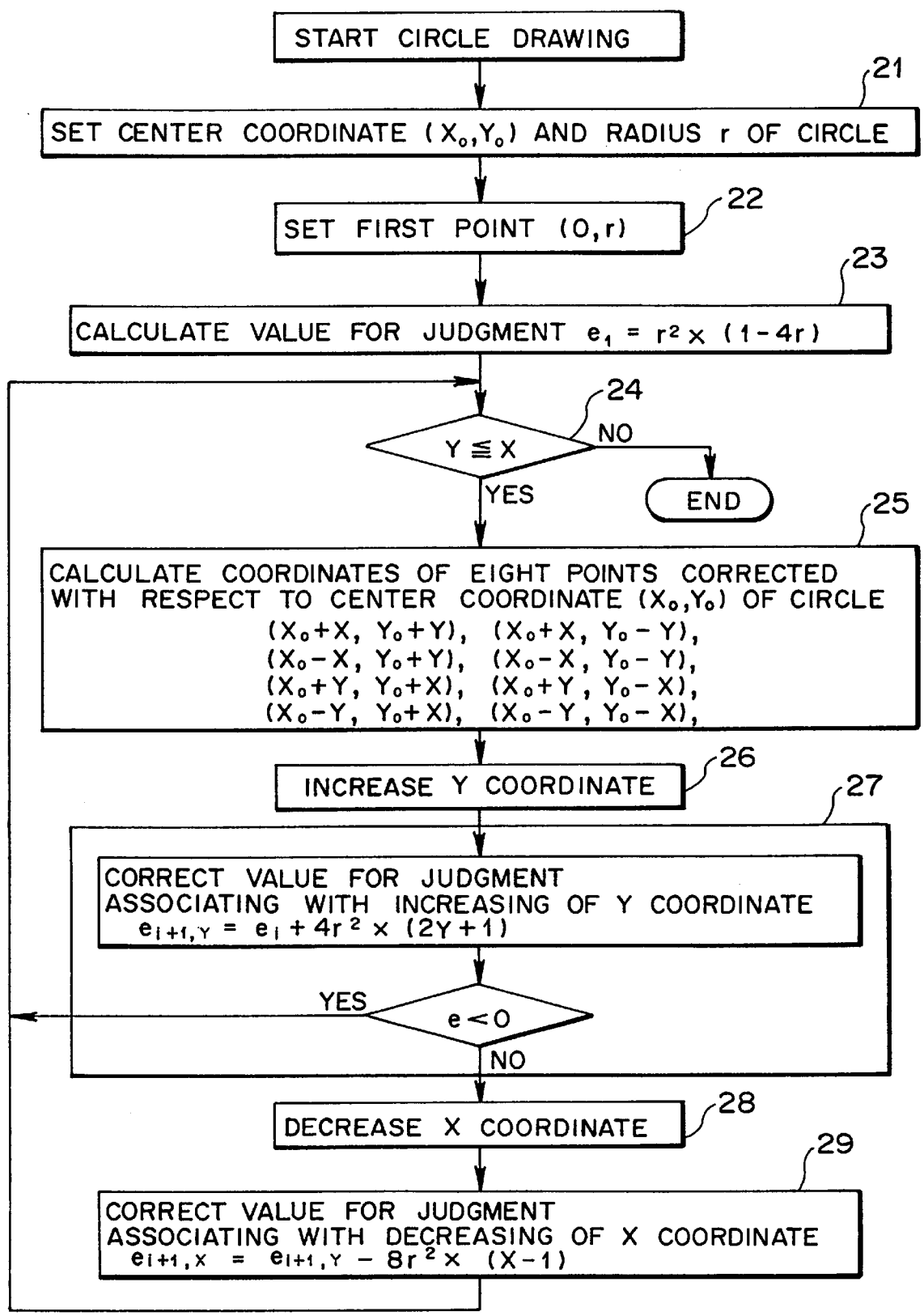
FIG. 7 is a flowchart showing definitely the second embodiment of a circle drawing method according to the present invention.
Figure 8:
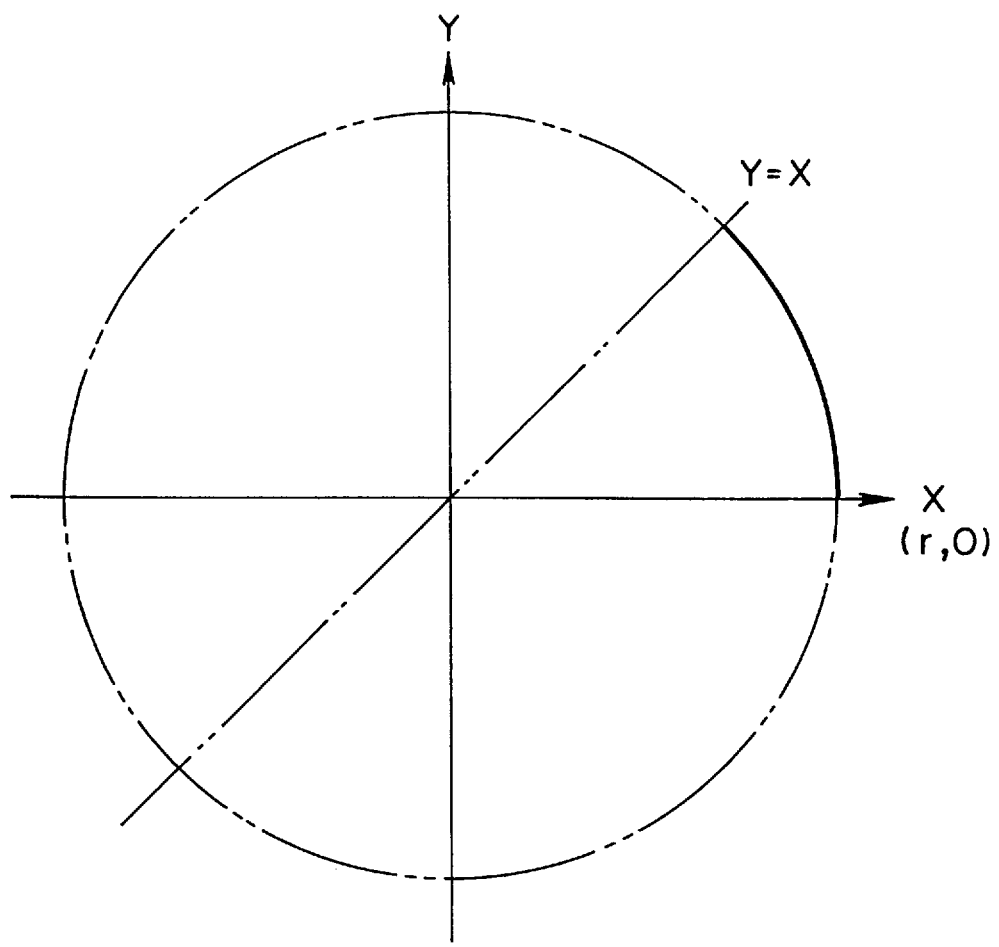
FIG. 8 is a diagrammatic illustration showing a one-eighth fraction of a circle directly derived from a value for judgment in the second embodiment of a circle drawing method.

Next, discussion will be given for the second embodiment of a circle drawing method according to the present invention. In this embodiment, upon drawing a one-eighth fraction of a circle, coordinates of respective points are derived by calculating the optimal X coordinates with increasing the Y coordinates one-by-one. FIG. 7 is a flowchart illustrating the second embodiment of a circle drawing method according to the present invention, and FIG. 8 is a diagrammatic illustration showing a one-eighth fraction of a circle directly derived from a value for judgment in the second embodiment of a circle drawing method. As shown in FIG. 8, it is assumed that a one-eighth fraction of a circle to be directly derived based on the value for judgment is a one-eighth fraction of the circle from the point (r, 0) to the intersection with the straight line Y=X. First, a center coordinate $(X_0, Y_0)$ and a radius r of the circle to be drawn are set (step 21). Next, (r, 0) is set as the coordinate of the first point (step 22). Then, the initial value $e_1$ of the value for judgment $e_i$ is derived (step 23).

Here, discussion will be given for the value for judgment and the correction method thereof in the second embodiment of the circle drawing method. First, the value for judgment $e_i$ in the shown embodiment of the method is expressed by the following equation (25) similarly to the method in the first embodiment.

$$e_i = 4r^2 \times (X^2 - X - r^2 + y^2) + r^2 \qquad (25)$$

Accordingly, the initial value $e_1$ of the value for judgment $e_i$ is expressed by the following equation (26).

$$\begin{aligned} e_1 &= 4r^2 \times (X^2 - X - r^2 + y^2) + r^2 \qquad (26) \\ &= 4r^2 \times (r^2 - r - r^2) + r^2 \\ &= r^2 \times (1 - 4r) \end{aligned}$$

On the other hand, variation $\Delta e_{k,Y}$ of the value for judgment when the Y coordinate is increased by one is expressed by the following equation (27).

$$\begin{aligned} \Delta e_{k,Y} &= e_{k+1,Y}(X, Y+1) - e_k(X, Y) \qquad (27) \\ &= 4r^2 \times (2Y+1) \end{aligned}$$

On the other hand, variation $\Delta e_{k,X}$ of the value for judgment when the X coordinate is decreased by one is expressed by the following equation (28).

$$\begin{aligned} \Delta e_{k,X} &= e_{k+1,X}(X-1, Y) - e_k(X, Y) \qquad (28) \\ &= -8r^2 \times (X-1) \end{aligned}$$

Namely, the value for judgment $e_{i+1,Y}$ after increasing the Y coordinate by one is expressed by the following equation (29) and the value for judgment $e_{i+1,X}$ after further decreasing the X coordinate by one is expressed by the following equation (30).

$$e_{i+1,Y} = e_i + \Delta e_{i,Y} \qquad (29)$$

$$e_{i+1,X} = e_{i+1,Y} + \Delta e_{i,X} \qquad (30)$$

After calculating $e_1$ at step 23, process enters a routine for calculating the coordinates of points on the one-eighth fraction of the circle. In this routine, first, a check is performed whether the latest point passes a terminating point distanced for one-eight of a circumferential length of the entire circle from the first point or not (step 24). In the shown embodiment of the method, a check is performed whether the following formula (31) is satisfied or not.

$$X \geq Y \qquad (31)$$

If the foregoing formula (31) is satisfied, judgment can be made that the terminating point is not yet passed. Then, process is advanced to the next step. On the other hand, when the foregoing formula (31) is not satisfied, drawing process goes end.

Since the terminating point is not passed at the first point, a point symmetric to the first point (r, 0) with respect to the straight line Y=X is derived. Also, points symmetric to these two points with respect to the origin (0, 0), the X-axis or the Y-axis are derived, respectively. As set forth above, from the point (X, Y) the following points are derived and used for drawing the circle.

$(X_0+X, Y_0+Y)$, $(X_0+X, Y_0-Y)$, $(X_0-X, Y_0+Y)$, $(X_0-X, Y_0-Y)$, $(X_0+Y, Y_0+X)$, $(X_0+Y, Y_0-X)$, $(X_0-Y, Y_0+X)$ and $(X_0-Y, Y_0-X)$ From the first point (r, 0), points (-r, 0), (0, r) and (0, -r) are obtained.

Next, the Y coordinate is increased by one (step 26). Then, the value for judgment $e_1$ is corrected to derive the value for judgment $e_{2,Y}$. At this time, since the Y coordinate at the first point is 0, the value for judgment $e_{2,Y}$ is expressed by the following equation (32).

$$\begin{aligned} e_{2,Y} &= e_1 + \Delta e_{1,Y} \qquad (32) \\ &= r^2 \times (1-4r) + 4r^2 \times (2Y+1) \\ &= r^2 \times (1-4r) + 4r^2 \\ &\phantom{=} r^2 \times (5-4r) \end{aligned}$$

In the shown embodiment, the value for judgment $e_{2,Y}$ is negative, the process is then returned to the step 14 with setting $e_2 = e_{2,Y} = r^2 \times (5-4r)$ (step 27).

At the step 27, when the value for judgment $e_{i+1,Y}$ is greater than or equal to 0, process is advanced to the step 28. Then, the X coordinate is decreased by on e (step 28). Thereafter, the value for judgment $e_{i+1,Y}$ is corrected, and the value for judgment $e_{i+1,X}$ is calculated (step 29). Subsequently, the process returns to the step 24. At this time, the value for judgment $e_{i+1,X}$ is used as a value for judgment $e_{i-1}$ at the next routine. Then, the routine from the step 24 to the step 29 is repeated until the terminating point is judged to have been passed at the step 24.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

For instance, in the first and second embodiment, coordinate system established by taking the X-axis as the horizontal axis and the Y-axis as the vertical axis is employed. However, it is also possible to employ a coordinate system established by taking the Y-axis as the horizontal axis and the X-axis as the vertical axis. When the axes in the coordinate system in the first embodiment is reversed, the coordinate system becomes equivalent to that of the second embodiment.

It should be appreciated that the first point to be the starting point for drawing the circle radius r is not limited to (0, r) or (r, 0) but can be (0, -r) or (-r, 0) as the first point. Also, coordinate position of the fraction of the circle to be directly drawn from the value for judgment is not necessarily specific position as illustrated. For example, it is possible to derive a one-eighth fraction of a circuit up to the straight line Y=X in the second quadrant as taking the point (0, r) as the first point. In these case, similarly to the method of the shown embodiment, appropriate value for judgment depending on the condition and variation thereof and so forth has to be obtained.

When the Y coordinate is increased accompanying with increase of the X coordinate, the following equations (33) and (34) are established.

$$\Delta e_{k,X} = -4r^2 \times (2X+1) \qquad (33)$$

$$\Delta e_{k,Y} = -8r^2 \times (Y+1) \qquad (34)$$

When the Y coordinate is decreased accompanying with decrease of the X coordinate, the following equations (35) and (36) are established.

$$\Delta e_{k,X} = -4r^2 \times (2X-1) \qquad (35)$$

$$\Delta e_{k,Y} = -8r^2 \times (Y-1) \qquad (36)$$

When the Y coordinate is increased accompanying with decrease of the X coordinate, the following equations (37) and (38) are established.

$$\Delta e_{k,X} = 4r^2 \times (2X-1) \quad (37)$$

$$\Delta e_{k,Y} = -8r^2 \times (Y+1) \quad (38)$$

When the X coordinate is increased accompanying with increase of the Y coordinate, the following equations (39) and (40) are established.

$$\Delta e_{k,Y} = -4r^2 \times (2Y+1) \quad (39)$$

$$\Delta e_{k,X} = -8r^2 \times (X+1) \quad (40)$$

When the X coordinate is decreased accompanying with decrease of the Y coordinate, the following equations (41) and (42) are established.

$$\Delta e_{k,Y} = -4r^2 \times (2Y-1) \quad (41)$$

$$\Delta e_{k,X} = -8r^2 \times (X-1) \quad (42)$$

When the X coordinate is increased accompanying with decrease of the Y coordinate, the following equations (43) and (44) are established.

$$\Delta e_{k,Y} = 4r^2 \times (2Y-1) \quad (43)$$

$$\Delta e_{k,X} = -8r^2 \times (X+1) \quad (44)$$

What is claimed is:

1. A circle drawing method comprising the steps of:

setting a coordinate of the center and a radius of a circle to be drawn;

setting a starting point for drawing the circle;

deriving a value for judgment at said starting point;

checking whether a terminating point distanced from said starting point in a distance corresponding to a one-eighth fraction of an entire circumferential length of the circle to be drawn is passed by the latest set point or not, and terminating drawing process when said terminating point is passed;

deriving all points symmetric to said set point with respect to at least one straight line selected from a group consisted of the straight line Y=X, the X-axis and the Y-axis for use in drawing the circle when said terminating point is not passed;

varying the X coordinate of said set point;

deriving a value for judgment associating with variation of the X coordinate of said set point with the latest value for judgment, checking whether a distance between the Y coordinate of a first varied point where only the X coordinate is varied from said set point and the true Y coordinate on the circle at the same X coordinate is less than 0.5 or not, and setting said first varied point as a new set point and then returning to the step of checking whether said terminating point is passed or not, when the distance between the Y coordinate of said first varied point and the true Y coordinate is less than 0.5;

varying the Y coordinate from said first varied point when the distance between the Y coordinate of said first varied point and the true Y coordinate is greater than or equal to 0.5; and deriving a value for judgment associated with variation of the Y coordinate of said first varied point with the latest value for judgment, setting a second varied point where only the Y coordinate is varied from said first varied point as a new set point, and then returning to the step of checking whether said terminating point is passed or not.

2. A circle drawing method as set forth in claim 1, wherein said radius of the circle is r and said starting point is (0, r), the step of varying the X coordinate of said set point is a step of increasing the X coordinate of said set point, the step of varying the Y coordinate of said set point is a step of decreasing the Y coordinate, the value for judgment at said starting point is $r^2 \times (1-4r)$, the step of deriving the value for judgment associating with variation of the X coordinate of said set point includes a step of adding $4r^2 \times (2X+1)$ to said latest value for judgment assuming the coordinate of said set point is (X, Y), the step of deriving the value for judgment associating with variation of the Y coordinate of said first varied point includes a step of adding $-8r^2 \times (Y-1)$ to said latest value for judgment, and the step of checking whether the distance between the Y coordinate of said first varied point and the true Y coordinate is less than 0.5 based on said value for judgment includes a step of making judgment that the distance between the Y coordinate of said first varied point and the true Y coordinate is less than 0.5, when said value for judgment is negative.

3. A circle drawing method as set forth in claim 1, wherein said radius of the circle is r and said starting point is (0, r), the step of varying the X coordinate of said set point is a step of decreasing the X coordinate of said set point, the step of varying the Y coordinate of said set point is a step of decreasing the Y coordinate, the value for judgment at said starting point is $r^2 \times (1-4r)$, the step of deriving the value for judgment associating with variation of the X coordinate of said set point includes a step of adding $-4r^2 \times (2X-1)$ to said latest value for judgment assuming the coordinate of said set point is (X, Y), the step of deriving the value for judgment associating with variation of the Y coordinate of said first varied point includes a step of adding $-8r^2 \times (Y-1)$ to said latest value for judgment, and the step of checking whether the distance between the Y coordinate of said first varied point and the true Y coordinate is less than 0.5 based on said value for judgment includes a step of making judgment that the distance between the Y coordinate of said first varied point and the true Y coordinate is less than 0.5, when said value for judgment is negative.

4. A circle drawing method as set forth in claim 1, wherein said radius of the circle is r and said starting point is (0, −r), the step of varying the X coordinate of said set point is a step of increasing the X coordinate of said set point, the step of varying the Y coordinate of said set point is a step of increasing the Y coordinate, the value for judgment at said starting point is $r^2 \times (1+4r)$, the step of deriving the value for judgment associating with variation of the X coordinate of said set point includes a step of adding $-4r^2 \times (2X+1)$ to said latest value for judgment assuming the coordinate of said set point is (X, Y), the step of deriving the value for judgment associating with variation of the Y coordinate of said first varied point includes a step of adding $-8r^2 \times (Y+1)$ to said latest value for judgment, and the step of checking whether the distance between the Y coordinate of said first varied point and the true Y coordinate is less than 0.5 based on said value for judgment includes a step of making judgment that the distance between the Y coordinate of said first varied point and the true Y coordinate is less than 0.5, when said value for judgment is negative.

5. A circle drawing method as set forth in claim 1, wherein said radius of the circle is r and said starting point is (0, −r), the step of varying the X coordinate of said set point is a step of decreasing the X coordinate of said set point, the step of varying the Y coordinate of said set point is a step of increasing the Y coordinate, the value for judgment at said starting point is $r^2 \times (1+4r)$, the step of deriving the value for judgment associating with variation of the X coordinate of said set point includes a step of adding $4r^2 \times (2X-1)$ to said latest value for judgment assuming the coordinate of said set point is (X, Y), the step of deriving the value for judgment associating with variation of the Y coordinate of said first varied point includes a step of adding $-8r^2 \times (Y+1)$ to said latest value for judgment, and the step of checking whether the distance between the Y coordinate of said first varied point and the true Y coordinate is less than 0.5 based on said value for judgment includes a step of making judgment that the distance between the Y coordinate of said first varied point and the true Y coordinate is less than 0.5, when said value for judgment is negative.

6. A circle drawing method comprising the steps of:

setting a coordinate of the center and a radius of a circle to be drawn;

setting a starting point for drawing the circle;

deriving a value for judgment at said starting point;

checking whether a terminating point distanced from said starting point in a distance corresponding to a one-eighth fraction of an entire circumferential length of the circle to be drawn is passed by the latest set point or not, and terminating drawing process when said terminating point is passed;

deriving all points symmetric to said set point with respect to at least one straight line selected from a group consisted of the straight line Y=X, the X-axis and the Y-axis for use in drawing the circle when said terminating point is not passed;

varying the X coordinate of said set point;

deriving a value for judgment associating with variation of the X coordinate of said set point with the latest value for judgment, checking whether a distance between the Y coordinate of a first varied point where only the X coordinate is varied from said set point and the true Y coordinate on the circle at the same X coordinate is less than or equal to 0.5 or not, and setting said first varied point as a new set point and then returning to the step of checking whether said terminating point is passed or not, when the distance between the Y coordinate of said first varied point and the true Y coordinate is less than or equal to 0.5;

varying the Y coordinate from said first varied point when the distance between the Y coordinate of said first varied point and the true Y coordinate is greater than 0.5; and deriving a value for judgment associated with variation of the Y coordinate of said first varied point with the latest value for judgment, setting a second varied point where only the Y coordinate is varied from said first varied point as a new set point, and then returning to the step of checking whether said terminating point is passed or not.

7. A circle drawing method as set forth in claim 6, wherein said radius of the circle is r and said starting point is (0, r), the step of varying the X coordinate of said set point is a step of increasing the X coordinate of said set point, the step of varying the Y coordinate of said set point is a step of decreasing the Y coordinate, the value for judgment at said starting point is $r^2 \times (1-4r)$, the step of deriving the value for judgment associating with variation of the X coordinate of said set point includes a step of adding $4r^2 \times (2X+1)$ to said latest value for judgment assuming the coordinate of said set point is (X, Y), the step of deriving the value for judgment associating with variation of the Y coordinate of said first varied point includes a step of adding $-8r^2 \times (Y-1)$ to said latest value for judgment, and the step of checking whether the distance between the Y coordinate of said first varied point and the true Y coordinate is less than or equal to 0.5 based on said value for judgment includes a step of making judgment that the distance between the Y coordinate of said first varied point and the true Y coordinate is less than or equal to 0.5, when said value for judgment is negative.

8. A circle drawing method as set forth in claim 6, wherein said radius of the circle is r and said starting point is (0, r), the step of varying the X coordinate of said set point is a step of decreasing the X coordinate of said set point, the step of varying the Y coordinate of said set point is a step of decreasing the Y coordinate, the value for judgment at said starting point is $r^2 \times (1-4r)$, the step of deriving the value for judgment associating with variation of the X coordinate of said set point includes a step of adding $-4r^2 \times (2X-1)$ to said latest value for judgment assuming the coordinate of said set point is (X, Y), the step of deriving the value for judgment associating with variation of the Y coordinate of said first varied point includes a step of adding $-8r^2 \times (Y-1)$ to said latest value for judgment, and the step of checking whether the distance between the Y coordinate of said first varied point and the true Y coordinate is less than or equal to 0.5 based on said value for judgment includes a step of making judgment that the distance between the Y coordinate of said first varied point and the true Y coordinate is less than or equal to 0.5, when said value for judgment is negative.

9. A circle drawing method as set forth in claim 6, wherein said radius of the circle is r and said starting point is (0, −r), the step of varying the X coordinate of said set point is a step of increasing the X coordinate of said set point, the step of varying the Y coordinate of said set point is a step of increasing the Y coordinate, the value for judgment at said starting point is $r^2 \times (1+4r)$, the step of deriving the value for judgment associating with variation of the X coordinate of said set point includes a step of adding $-4r^2 \times (2X+1)$ to said latest value for judgment assuming the coordinate of said set point is (X, Y), the step of deriving the value for judgment associating with variation of the Y coordinate of said first varied point includes a step of adding $-8r^2 \times (Y+1)$ to said latest value for judgment, and the step of checking whether the distance between the Y coordinate of said first varied point and the true Y coordinate is less than or equal to 0.5 based on said value for judgment includes a step of making judgment that the distance between the Y coordinate of said first varied point and the true Y coordinate is less than or equal to 0.5, when said value for judgment is negative.

10. A circle drawing method as set forth in claim 6, wherein said radius of the circle is r and said starting point is (0, -r), the step of varying the X coordinate of said set point is a step of decreasing the X coordinate of said set point, the step of varying the Y coordinate of said set point is a step of increasing the Y coordinate, the value for judgment at said starting point is $r^2 \times (1+4r)$, the step of deriving the value for judgment associating with variation of the X coordinate of said set point includes a step of adding $4r^2 \times (2X-1)$ to said latest value for judgment assuming the coordinate of said set point is (X, Y), the step of deriving the value for judgment associating with variation of the Y coordinate of said first varied point includes a step of adding $-8r^2 \times (Y+1)$ to said latest value for judgment, and the step of checking whether the distance between the Y coordinate of said first varied point and the true Y coordinate is less than or equal to 0.5 based on said value for judgment includes a step of making judgment that the distance between the Y coordinate of said first varied point and the true Y coordinate is less than or equal to 0.5, when said value for judgment is negative.

* * * * *

UNITED STATES PATENT AND TRADEMARK OFFICE
CERTIFICATE OF CORRECTION

PATENT NO. : 5,874,968
DATED : February 23, 1999
INVENTOR(S) : Kiyoko HAMA

It is certified that error appears in the above-identified patent and that said Letters Patent is hereby corrected as shown below:

Column 1, line 21,
Equation 1, delete in its entirety and insert $-- f(Z_i) = R^2 - \{(X_{i-1} - \tfrac{1}{2})^2 + (Y_{i-1} + 1)^2\} --$
Column 1, line 42,
Equation 6, delete in its entirety and insert $-- \Delta X_i = \Delta X_{i-1} --$.
Column 1 line 44,
Equation 7, delete in its entirety and insert $-- f(Z_i) = f(Z_i) - \Delta Y_{i-1} + \Delta X_{i-1} --$.
Column 7, lines 29 and 31,
Equation 14, delete in its entirety and insert
$$-- Y < (r^2 - x^2)^{1/2} + 0.5$$
$$4r^2 \times (Y^2 - Y - r^2 + x^2) + r^2 < 0 --.$$

Column 8, line 22, delete "$e_{i+x}$" and insert $-- e_{i+1,x} --$.

Column 12, line 12, delete "on e" and insert --one--; and

Column 12, line 17, delete "$e_{i-1}$" and insert $-- e_{i+1} --$.

Signed and Sealed this

Fourteenth Day of September, 1999

Attest:

Q. TODD DICKINSON

*Attesting Officer*  *Acting Commissioner of Patents and Trademarks*